(12) United States Patent
Kono et al.

(10) Patent No.: US 11,099,128 B2
(45) Date of Patent: Aug. 24, 2021

(54) OPTICAL ANALYSIS DEVICE, OPTICAL ANALYSIS METHOD, AND OPTICAL ANALYSIS

(71) Applicant: HITACHI, LTD., Tokyo (JP)

(72) Inventors: Shunsuke Kono, Tokyo (JP); Takuya Kambayashi, Tokyo (JP); Toshimitsu Noguchi, Tokyo (JP); Akihiro Nojima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 182 days.

(21) Appl. No.: 16/654,743

(22) Filed: Oct. 16, 2019

(65) Prior Publication Data

US 2020/0124526 A1 Apr. 23, 2020

(30) Foreign Application Priority Data

Oct. 17, 2018 (JP) .............................. JP2018-195776

(51) Int. Cl.
*G01N 21/359* (2014.01)
*G01N 21/3577* (2014.01)
*G01N 21/3518* (2014.01)

(52) U.S. Cl.
CPC ....... *G01N 21/359* (2013.01); *G01N 21/3577* (2013.01); *G01N 2021/3527* (2013.01)

(58) Field of Classification Search
CPC ....... G01N 2021/1729; G01N 21/3577; G01N 21/359; G01N 21/51
See application file for complete search history.

(56) References Cited

U.S. PATENT DOCUMENTS

2018/0172584 A1* 6/2018 Kanbayashi ....... G01N 21/1717

FOREIGN PATENT DOCUMENTS

JP 11-310541 A 11/1999

* cited by examiner

*Primary Examiner* — Mark R Gaworecki
(74) *Attorney, Agent, or Firm* — Volpe Koenig

(57) ABSTRACT

In order to analyze a solution component and a scatterer component in a liquid sample more quickly, there is provided an optical analysis device including a light source unit configured to irradiate a liquid sample with light; a first light receiving unit configured to receive transmitted light emitted from the light source unit and transmitted through the liquid sample; a second light receiving unit configured to receive scattered light emitted from the light source unit and scattered by a scatterer in the liquid sample; an ultrasonic irradiation unit configured to irradiate the liquid sample with an ultrasonic wave; a reflection plate configured to reflect the ultrasonic wave that is emitted from the ultrasonic irradiation unit and propagated through the liquid sample; and a control unit configured to control the light source unit, the first light receiving unit, the second light receiving unit, and the ultrasonic irradiation unit.

13 Claims, 13 Drawing Sheets

OPTICAL ANALYSIS DEVICE, OPTICAL ANALYSIS METHOD, AND OPTICAL ANALYSIS

BACKGROUND OF THE INVENTION

1. Field of the Invention

The present invention relates to an optical analysis device, an optical analysis method, and an optical analysis system.

2. Description of the Related Art

In order to grasp a progress of a reaction in a reaction vessel in which processing such as cell culture and chemical synthesis is performed, a method of optical analysis of a component contained in a liquid sample in the reaction vessel is known.

For example, JP-A-11-310541 (Patent Literature 1) describes "a method and a device for rapidly and efficiently adjusting and optimizing a xylene isomer separation and an isomerization process by measuring information necessary for sample separation adjustment with a near-infrared analysis device".

According to the optical analysis, a liquid sample can be analyzed non-destructively, non-invasively and immediately, so that the sample after analysis can be reused, and an operation time required for analysis can be shortened.

Incidentally, the liquid sample such as a cell culture solution includes a solution component dissolved in the liquid sample and a non-dissolved scatterer component. For example, in a cell culture solution, dissolved saccharide or the like corresponds to the solution component, and a non-dissolved cell or the like corresponds to the scatterer component. Since both the solution component and the scatterer component can be optically analyzed and serve as an index indicating a progress of a reaction of the liquid sample, it is desirable that both the solution component and the scatterer component can be analyzed quickly.

In the related art, a method using light that passes through a liquid sample is known to analyze a solution component in the liquid sample, and a method using scattered light in a liquid sample (a scatterer contained therein) is known to analyze a scatterer component.

As described above, a method of analyzing a solution component and a scatterer component in a liquid sample is known, but the solution component and the scatterer component in the liquid sample cannot be quickly analyzed by a single optical analysis device.

SUMMARY OF THE INVENTION

The invention is made in view of such a situation, and an object thereof is to enable a solution component and a scatterer component in a liquid sample to be analyzed more quickly.

The present application includes a plurality of methods for solving at least a part of the problems described above, and examples thereof are as follows. In order to solve the above problems, the invention provides an optical analysis device including a light source unit configured to irradiate a liquid sample with light; a first light receiving unit configured to receive transmitted light that is emitted from the light source unit and transmitted through the liquid sample; a second light receiving unit configured to receive scattered light that is emitted from the light source unit and scattered by a scatterer in the liquid sample; an ultrasonic irradiation unit configured to irradiate the liquid sample with an ultrasonic wave; a reflection plate configured to reflect the ultrasonic wave that is emitted from the ultrasonic irradiation unit and propagated through the liquid sample; and a control unit configured to control the light source unit, the first light receiving unit, the second light receiving unit, and the ultrasonic irradiation unit.

According to the invention, a solution component and a scatterer component in a liquid sample can be analysed more quickly.

Problems, configurations and effects other than the above will be apparent with reference to description of following embodiments.

DESCRIPTION OF EMBODIMENTS

Figure 1:
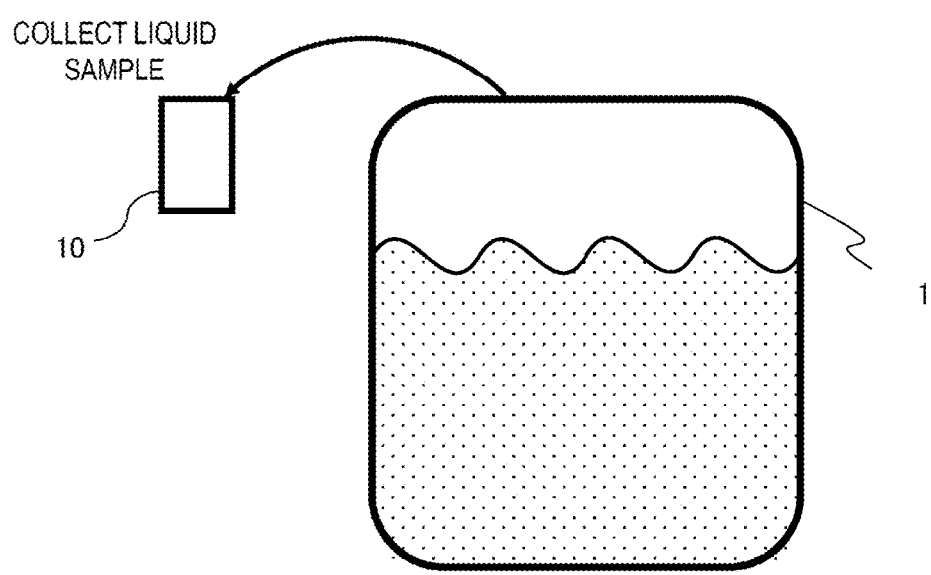
FIG. 1 is a diagram illustrating an outline of an optical analysis device 10 according to a first embodiment of the invention.

In each embodiment to be described below, description may be divided into a plurality of sections or embodiments if necessary for convenience, unless particularly demonstrated, these embodiments are not independent with each other, but in a relationship in which one embodiment is a variation, detailed description, supplementary description, or the like of a part or all of another embodiment. In each embodiment, when referring to the number of elements (including number, numerical value, amount, range, and the like), the number is not limited to the specific number, and may be a specific number or more and may be equal to or less than a specific number.

In each embodiment, it is needless to say that constituent elements (including element steps and the like) are not always essential, unless specifically indicated or unless clearly considered to be essential in principle. Similarly, in each embodiment, when the shape of the constituent elements, positional relation thereof, and the like are described, the substantially approximate and similar shapes and the like are included therein unless otherwise stated or except the case where it is conceivable that they are apparently excluded in principle. The same also applies to the numeric value and the ranges described above. In all the drawings for describing each embodiment, the same components are denoted by the same reference numerals in principle, and the repetitive description thereof will be omitted.

Hereinafter, embodiments of the invention will be described with reference to the drawings.

<Optical Analysis Device According to First Embodiment of Invention>

FIG. 1 is a diagram illustrating an outline of an optical analysis device 10 according to a first embodiment of the invention.

The optical analysis device 10 measures a solution component and a scatterer component in a liquid sample by setting the liquid sample collected from a reaction vessel 1 in which processing such as cell culture, chemical synthesis and the like is performed as an analysis target, irradiating the liquid sample accommodated in a measurement cell 14 (FIG. 2) with light of a predetermined wavelength, and performing optical analysis (for example, spectral analysis) of light that is transmitted through the liquid sample and light that is scattered by a scatterer in the liquid sample. The optical analysis is not limited to the spectral analysis, and other methods may be adopted.

The liquid sample is assumed to be, for example, a culture solution of cells, microorganisms and fungi, a liquid raw material for processing such as chemical synthesis, an emulsion containing an oil droplet, but the liquid sample is not limited thereto, and a solution containing a scatterer can be used as the liquid sample.

<Configuration Example of Optical Analysis Device 10>

Figure 2:
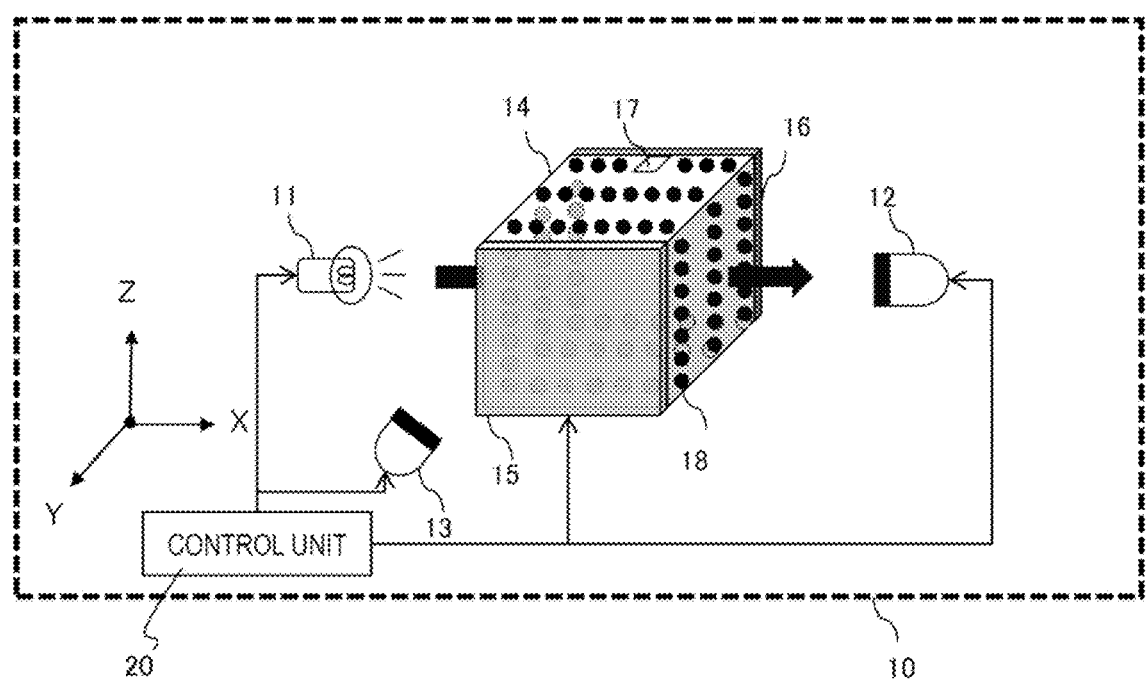
FIG. 2 is a diagram showing a configuration example of the optical analysis device 10.

Next, FIG. 2 shows a configuration example of the optical analysis device 10. The optical analysis device 10 includes a light source unit 11, a first light receiving unit 12, a second light receiving unit 13, the measurement cell 14, an ultrasonic irradiation unit 15, a reflection plate 16, and a control unit 20. An XYZ coordinate system is as illustrated, and the same applies to the subsequent drawings.

The light source unit 11 includes, for example, a beam generating device, a laser generating device, and a light emitting diode (LED). However, other devices may be employed as long as the devices can emit light of a predetermined wavelength. The light source unit 11 irradiates the liquid sample accommodated in the measurement cell 14 with light of a predetermined wavelength (for example, infrared light, near-infrared light, visible light, ultraviolet light, and x-ray) in accordance with control from the control unit 20.

The first light receiving unit 12 and the second light receiving unit 13 include, for example, a photomultiplier tube, a Si photodiode, an InGaAs photodiode, and a PbS photoconductive element. However, other devices may be employed as long as the devices can output a signal corresponding to the intensity of received light.

The first light receiving unit 12 is disposed at a position facing the light source unit 11 with the measurement cell 14 interposed therebetween. The first light receiving unit 12 receives light (hereinafter referred to as transmitted light) that is emitted from the light source unit 11 and transmitted through the liquid sample in the measurement cell 14, and outputs a light receiving result to the control unit 20 in accordance with the control from the control unit 20.

The second light receiving unit 13 is disposed closer to the light source unit 11 than a YZ plane closer to the light source unit 11 between two YZ planes of the measurement cell 14. The second light receiving unit 13 receives light (hereinafter referred to as scattered light) that is emitted from the light source unit 11 and scattered by a scatterer contained in the liquid sample accommodated in the measurement cell 14, and outputs a light receiving result to the control unit 20 in accordance with the control from the control unit 20.

The measurement cell 14 is a rectangular parallelepiped container that holds the liquid sample, and is formed of a material through which light from the light source unit 11 can be transmitted, for example, a substance such as quartz glass or acrylic. An introduction port 17 that introduces the liquid sample is provided on an upper XY plane between two XY planes of the measurement cell 14. An overall measurement cell 14 may be placed in a box or the like to shield external light, and the box is formed with openings through which light pass only at a position where the light source unit 11 emits light, a position where the first light receiving unit 12 receives transmitted light, and a position where the second light receiving unit 13 receives reflected light.

The ultrasonic irradiation unit 15 includes, for example, a piezoelectric ceramic element such as PZT, a P (VDF-TrFE) element, and a ZnO element. However, other elements may be employed as long as the elements can emit an ultrasonic wave. The ultrasonic irradiation unit 15 is bonded to an outer side (or an inner side) of one of two XZ planes of the measurement cell 14. The ultrasonic irradiation unit 15 irradiates the liquid sample accommodated in the measurement cell 14 with an ultrasonic wave in a Y-axis direction in accordance with the control from the control unit 20.

The reflection plate 16 is formed of a metal plate or the like that reflects an ultrasonic wave. The reflection plate 16 is bonded to an outer side (or an inner side) of an XZ plane to which the ultrasonic irradiation unit 15 is not bonded between the two XZ Planes of the measurement cell 14. The reflection plate 16 reflects the ultrasonic wave that is emitted from the ultrasonic irradiation unit 15 in a Y-axis direction.

The control unit 20 is configured by a computer including, for example, a central processing unit (CPU), a memory, a communication interface, a hard disk, a display. The control unit 20 controls the light source unit 11, the first light receiving unit 12, the second light receiving unit, and the ultrasonic irradiation unit 15.

The control unit 20 analyzes the solution component in the liquid sample based on the light receiving result of the transmitted light input from the first light receiving unit 12. The control unit 20 analyzes the scatterer component in the liquid sample based on the light receiving result of the scattered light input from the second light receiving unit 13. Further, the control unit 20 stores an analysis result in a storage device such as a hard disk, displays the analysis result on a display, or outputs the analysis result to an external device. The control unit 20 may not analyze the solution component and the scatterer component in the liquid sample, and may transmit the light receiving result of the transmitted light input from the first light receiving unit 12 and the light receiving result of the scattered light input from the second light receiving unit 13 to an external device (for example, a server on a network) for analysis.

FIG. 2 shows a case where an ultrasonic wave is emitted from the ultrasonic irradiation unit 15 in the optical analysis device 10. In this case, the ultrasonic wave from the ultrasonic irradiation unit 15 and the ultrasonic wave reflected by the reflection plate 16 interfere with each other in the liquid sample accommodated in the measurement cell 14 to generate a standing wave, and a node of the standing wave appears on a plurality of XZ planes perpendicular to a Y-axis at equal intervals. Further, the scatterers 18 in the liquid sample are aggregated by an acoustic radiation force in the nodes of the standing wave.

The interval between the nodes of the standing wave of the ultrasonic wave depends on frequency of the ultrasonic wave, a sound velocity in the liquid sample, and the like. For example, when the sound velocity in the liquid sample is 1500 m/s and the frequency of the ultrasonic wave is 1 MHz, the interval between the nodes is 0.75 mm, which is half a wavelength of the ultrasonic wave, and an interval between the ultrasonic irradiation unit 15 and the reflection plate 16 needs to be an integer multiple thereof. However, a condition under which the standing wave is formed also depends on physical properties of the measurement cell 14, the ultrasonic irradiation unit 15 and the reflection plate 16, and impedance of a signal cable that connects the control unit 20 and the ultrasonic irradiation unit 15. Therefore, it is desirable to perform an experiment in advance before performing the optical analysis, finely adjust the frequency of the ultrasonic wave to be emitted, confirm formation of the standing wave by visual observation or the like, and determine an irradiation condition of the ultrasonic wave. When the scatterers 18 are aggregated by ultrasonic irradiation, a transparent region in which the number of the scatterers 18 is small is formed in the liquid sample, and most of the light that is emitted from the light source unit 11 can pass through the liquid sample in an X-axis direction and reach the first light receiving unit 12.

Figure 3:
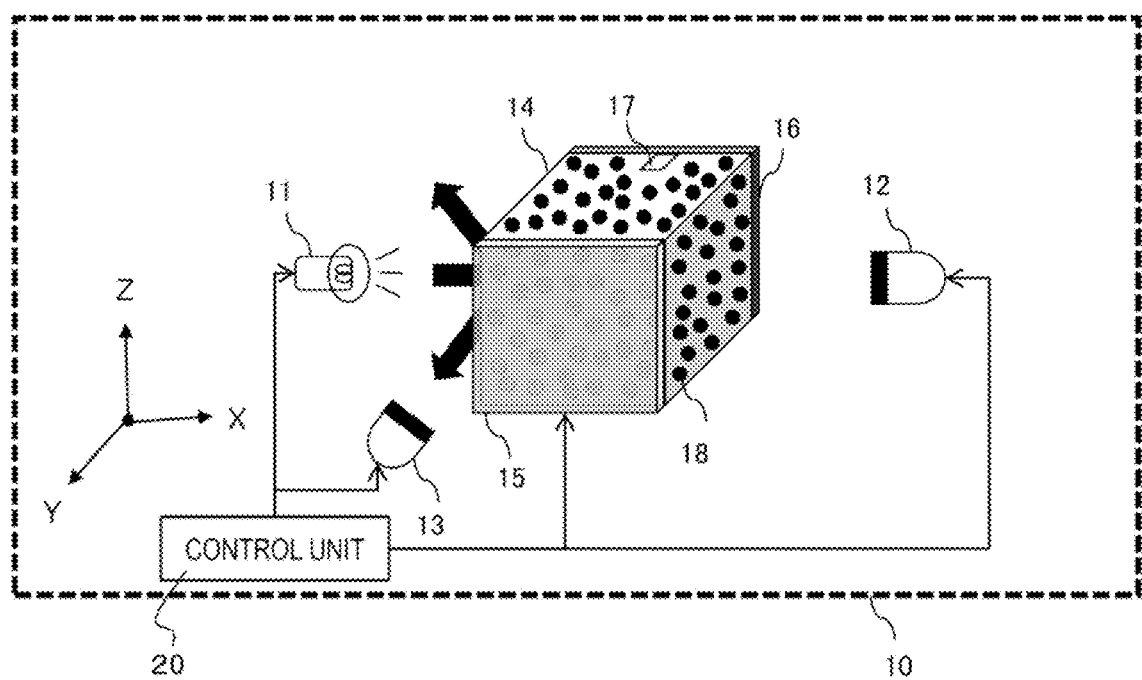
FIG. 3 is a diagram showing a case where an ultrasonic wave is not emitted in the optical analysis device 10.

Next, FIG. 3 shows a case where an ultrasonic wave is not emitted from the ultrasonic irradiation unit 15 in the optical analysis device 10. In this case, since no standing wave is generated in the liquid sample in the measurement cell 14, the scatterers 18 in the liquid sample are dispersed without being aggregated. Therefore, most of the light from the light source unit 11 is scattered (reflected) by the dispersed scatterers 18, and the scattered light can reach the second light receiving unit 13.

<Analysis Processing by Optical Analysis Device 10>

Figure 4:
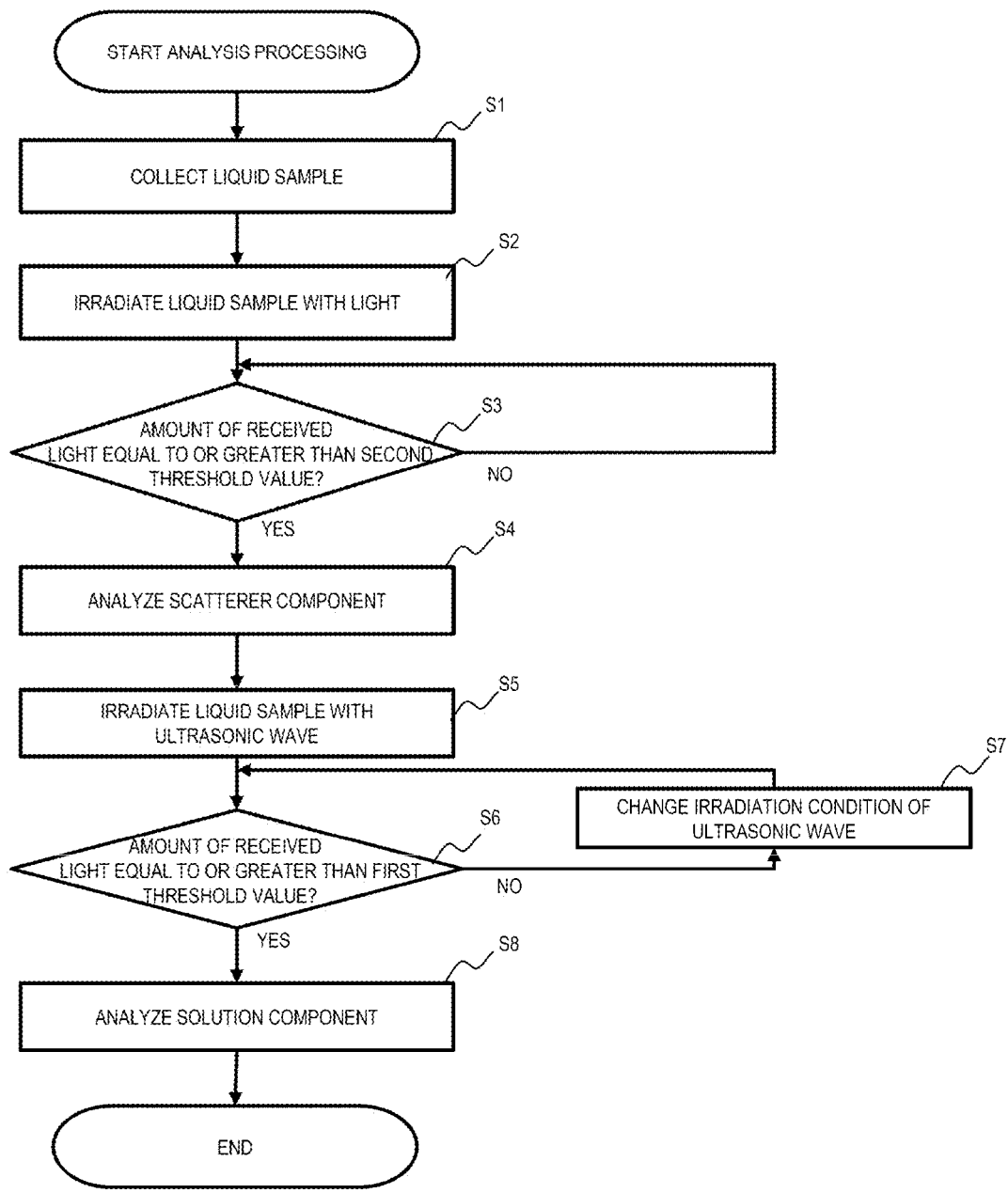
FIG. 4 is a flowchart illustrating an example of analysis processing by the optical analysis device 10.

Next, FIG. 4 is a flowchart illustrating an example of analysis processing (hereinafter, referred to as first analysis processing) by the optical analysis device 10. The first analysis processing is started according to, for example, a predetermined operation from a user.

First, a user collects a liquid sample from the reaction vessel 1 and introduces the liquid sample to the measurement cell 14 through the introduction port 17 (step S1). The liquid sample collected from the reaction vessel 1 contains scatterers, and the scatterers are uniformly dispersed in a solution sample over time.

Next, the light source unit 11 starts irradiating the liquid sample accommodated in the measurement cell 14 with light of a predetermined wavelength in accordance with the control from the control unit 20. Then, the second light receiving unit 13 starts receiving scattered light that is emitted from the light source unit 11 and reflected by the liquid sample in the measurement cell 14, and outputs a light receiving result to the control unit 20 in accordance with the control from the control unit 20 (step S2).

Next, the control unit 20 determines, based on the light receiving result from the second light receiving unit 13, whether an amount of received scattered light in the second light receiving unit 13 is equal to or greater than a predetermined second threshold value determined based on a predetermined experiment (step S3). Here, when the control unit 20 determines that the amount of received scattered light is less than the predetermined second threshold value (NO in step S3), the scatterers in the liquid sample are not sufficiently dispersed. Accordingly, monitoring of the light receiving result from the second light receiving unit 13 is continued until the amount of received scattered light is determined to be equal to or greater than the predetermined second threshold value. Thereafter, when the control unit 20 determines that the amount of received scattered light is equal to or greater than the predetermined second threshold value (YES in step S3), the processing proceeds to step S4.

Next, the control unit 20 analyzes the scatterer component in the liquid sample based on the light receiving result of the scattered light from the second light receiving unit 13, stores an analysis result in a hard disk or the like, displays the analysis result on a display, or outputs the analysis result to an external device (step S4). The control unit 20 may also output the light receiving result to an external device.

Next, the ultrasonic irradiation unit 15 starts irradiating the liquid sample in the measurement cell 14 with an ultrasonic wave in accordance with the control from the control unit 20 (step S5). Accordingly, a standing wave of the ultrasonic wave is generated in the liquid sample in the measurement cell 14, and the scatterers 18 start to aggregate in the node.

Next, the first light receiving unit 12 starts receiving transmitted light that is emitted from the light source unit 11 and transmitted through the liquid sample accommodated in the measurement cell 14, and outputs a light receiving result to the control unit 20 in accordance with the control from the control unit 20. Then, the control unit 20 determines, based on the light receiving result from the first light receiving unit 12, whether an amount of received transmitted light in the first light receiving unit 12 is equal to or greater than a predetermined first threshold value determined based on a predetermined experiment (step S6).

Here, when the control unit 20 determines that the amount of received transmitted light is less than the predetermined first threshold value (NO in step S6), the scatterers in the liquid sample are not sufficiently aggregated. Accordingly, the ultrasonic irradiation unit 15 changes an irradiation condition of the ultrasonic wave (for example, output strength and frequency) in accordance with the control from the control unit 20 so that the scatterers in the liquid sample are more easily aggregated (step S7). Thereafter, the processing returns to step S6, and step S6 and step S7 are repeated until the control unit 20 determines that the amount of received transmitted light is equal to or greater than the predetermined first threshold value. When the control unit 20 determines that the amount of received transmitted light is equal to or greater than the predetermined first threshold value (YES in step S6), the processing proceeds to step S8.

Next, the control unit 20 analyzes the solution component in the liquid sample based on the light receiving result of the transmitted light from the first light receiving unit 12, stores an analysis result in a hard disk or the like, displays the analysis result on a display, or outputs the analysis result to an external device (step S8). The control unit 20 may also output the light receiving result to an external device.

Thus, the first analysis processing by the optical analysis device 10 is ended. According to the first analysis processing, the scatterer component and the solution component in the liquid sample can be analyzed continuously and quickly. Since the analysis is performed after the amount of the received scattered light or the received transmitted light is equal to or greater than a predetermined threshold value, the optical analysis with higher accuracy can be performed. Further, since both the scatterer component and the solution component in the liquid sample can be analyzed by one optical analysis device 10, a scale of devices and the required number of each component can be reduced to half as compared with a case of using two optical analysis devices.

Figure 5:
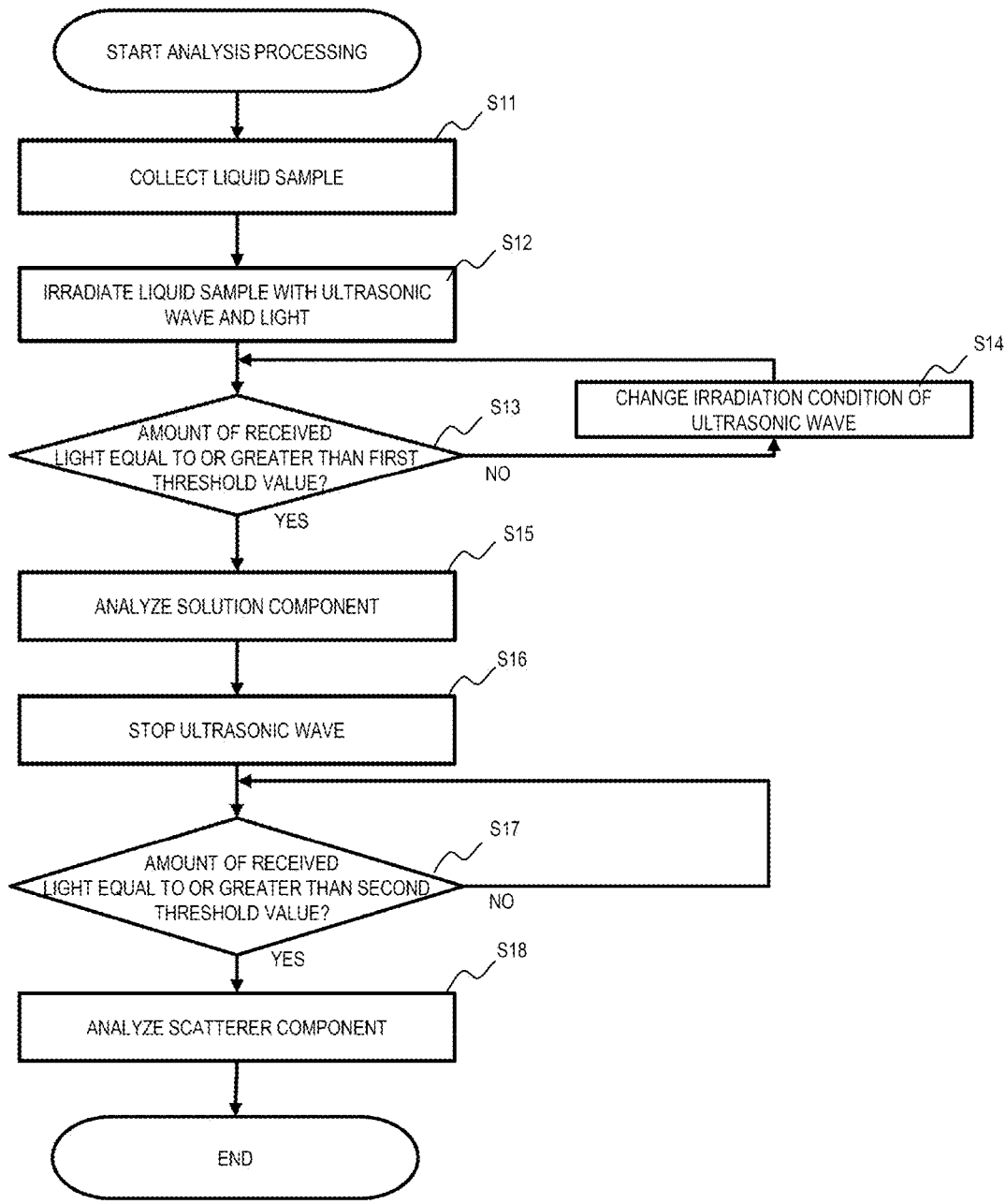
FIG. 5 is a flowchart illustrating another example of the analysis processing by the optical analysis device 10.

Next, FIG. 5 is a flowchart illustrating another example of the analysis processing by the optical analysis device 10 (hereinafter, referred to as second analysis processing). The second analysis processing is started according to, for example, a predetermined operation from a user.

First, a user collects a liquid sample from the reaction vessel 1 and introduces the liquid sample to the measurement cell 14 through the introduction port 17 (step S11). The liquid sample collected from the reaction vessel 1 contains scatterers, and the scatterers are uniformly dispersed in a solution sample over time.

Next, the ultrasonic irradiation unit 15 starts irradiating the liquid sample accommodated in the measurement cell 14 with an ultrasonic wave in accordance with the control from the control unit 20. Accordingly, a standing wave of the ultrasonic wave is generated in the liquid sample in the measurement cell 14, and the scatterers 18 start to aggregate in the node. At the same time, the light source unit 11 starts irradiating the liquid sample accommodated in the measurement cell 14 with light of a predetermined wavelength in accordance with the control from the control unit 20. Then, the first light receiving unit 12 starts receiving transmitted light that is emitted from the light source unit 11 and transmitted through the liquid sample in the measurement cell 14, and outputs a light receiving result to the control unit 20 in accordance with the control from the control unit 20 (step S12).

Next, the control unit 20 determines, based on the light receiving result from the first light receiving unit 12, whether an amount of received transmitted light in the first light receiving unit 12 is equal to or greater than a predetermined first threshold value determined based on a predetermined experiment (step S13).

Here, when the control unit 20 determines that the amount of received transmitted light is less than the predetermined first threshold value (NO in step S13), the scatterers in the liquid sample are not sufficiently aggregated. Accordingly, the ultrasonic irradiation unit 15 changes an irradiation condition of the ultrasonic wave (for example, output strength and frequency) in accordance with the control from the control unit 20 so that the scatterers in the liquid sample are more easily aggregated (step S14). Thereafter, the processing returns to step S13, and step S13 and step S14 are repeated until the control unit 20 determines that the amount of received transmitted light is equal to or greater than the predetermined first threshold value. When the control unit 20 determines that the amount of received transmitted light is equal to or greater than the predetermined first threshold value (YES in step S13), the processing proceeds to step S15.

Next, the control unit 20 analyzes the solution component in the liquid sample based on the light receiving result of the transmitted light from the first light receiving unit 12, stores an analysis result in a hard disk or the like, displays the analysis result on a display, or outputs the analysis result to an external device (step S15). The control unit 20 may also output the light receiving result to an external device.

Next, the ultrasonic irradiation unit 15 stops ultrasonic irradiation in accordance with the control from the control unit 20 (step S16). Accordingly, the standing wave of the ultrasonic wave in the liquid sample accommodated in the measurement cell 14 disappears, and the scatterers 18 start to disperse in the liquid sample.

Next, the second light receiving unit 13 starts receiving scattered light that is emitted from the light source unit 11 and scattered by the scatterers in the liquid sample in the measurement cell 14, and outputs a light receiving result to the control unit 20 in accordance with the control from the control unit 20. Then, the control unit 20 determines, based on the light receiving result from the second light receiving unit 13, whether an amount of received scattered light in the second light receiving unit 13 is equal to or greater than a predetermined second threshold value determined based on the predetermined experiment (step S17).

Here, when the control unit 20 determines that the amount of received scattered light is less than the predetermined second threshold value (NO in step S17), the scatterers in the liquid sample are not sufficiently dispersed. Accordingly, monitoring of the light receiving result from the second light receiving unit 13 is continued until the amount of received scattered light is determined to be equal to or greater than the predetermined second threshold value. Thereafter, when the control unit 20 determines that the amount of received scattered light is equal to or greater than the predetermined second threshold value (YES in step S17), the processing proceeds to step S18.

Next, the control unit 20 analyzes the scatterer component in the liquid sample based on the light receiving result of the scattered light from the second light receiving unit 13, stores an analysis result in a hard disk or the like, displays the analysis result on a display, or outputs the analysis result to an external device (step S18). The control unit 20 may also output the light receiving result to an external device.

Thus, the second analysis processing by the optical analysis device 10 is ended. According to the second analysis processing, the scatterer component and the solution component in the liquid sample can be analyzed continuously and quickly. Further, since both the scatterer component and the solution component in the liquid sample can be analyzed by one optical analysis device 10, a scale of devices and the required number of each component can be reduced to half as compared with a case of using two optical analysis devices.

When comparing the first analysis processing and the second analysis processing, a waiting time until the scatterers are sufficiently dispersed in the sample liquid (step S3 in FIG. 4 and step S17 in FIG. 5) is shortened in the first analysis processing. Therefore, the first analysis processing can end a series of analysis Processing in a shorter time than the second analysis processing.

<Optical Analysis System According to Second Embodiment of Invention>

Figure 6:
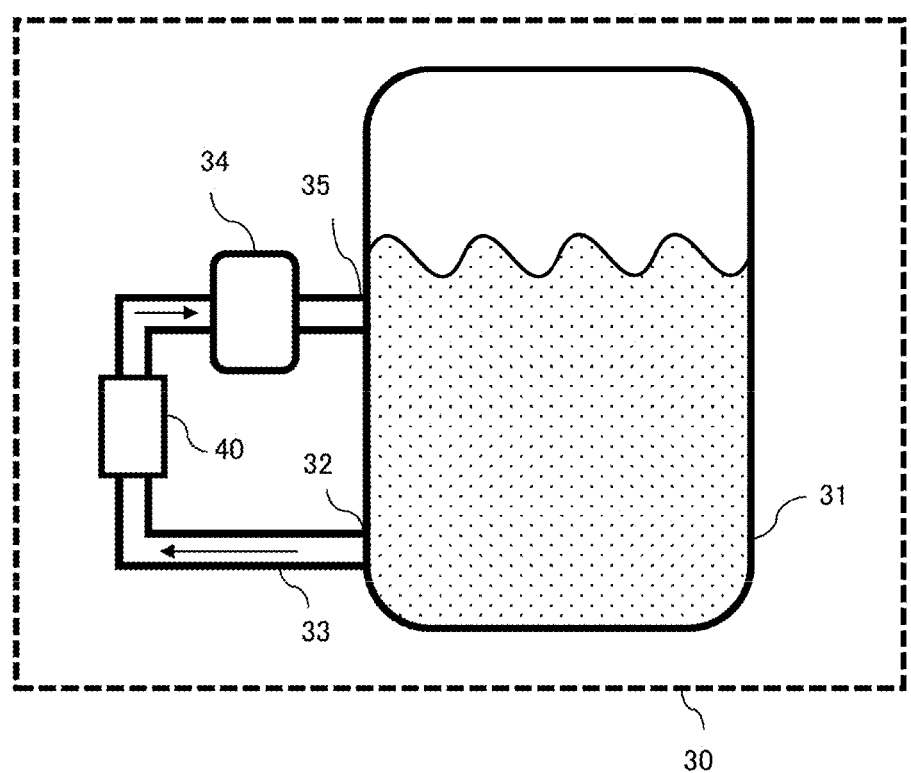
FIG. 6 is a diagram illustrating an outline of an optical analysis system 30 according to a second embodiment of the invention.

FIG. 6 is a diagram illustrating an outline of an optical analysis system 30 according to a second embodiment of the invention.

In the optical analysis system 30, a reaction vessel 31 in which processing such as cell culture and chemical synthesis is performed and an optical analysis device 40 are connected via a pipe 33 and a pump 34. Therefore, the optical analysis device 10 (FIG. 2) sets a liquid sample in a stationary state as an analysis target, whereas the optical analysis system 30 sets a liquid sample in a state of being circulated by the pump 34 as an analysis target.

The optical analysis device 40 measures a solution component or a scatterer component in the liquid sample in the same manner as the optical analysis device 10 (FIG. 2). Accordingly, the optical analysis system 30 is suitable for use when analyzing a liquid sample in which it is not desirable to stop a flow rate. However, while the optical analysis device 40 performs analysis processing, the pump 34 may be stopped to stop circulation of the liquid sample. Further, after the analysis processing is performed by the optical analysis device 40, the pump 34 may be stopped to stop the circulation of the liquid sample.

<Configuration Example of Optical Analysis Device 40>

Figure 7:
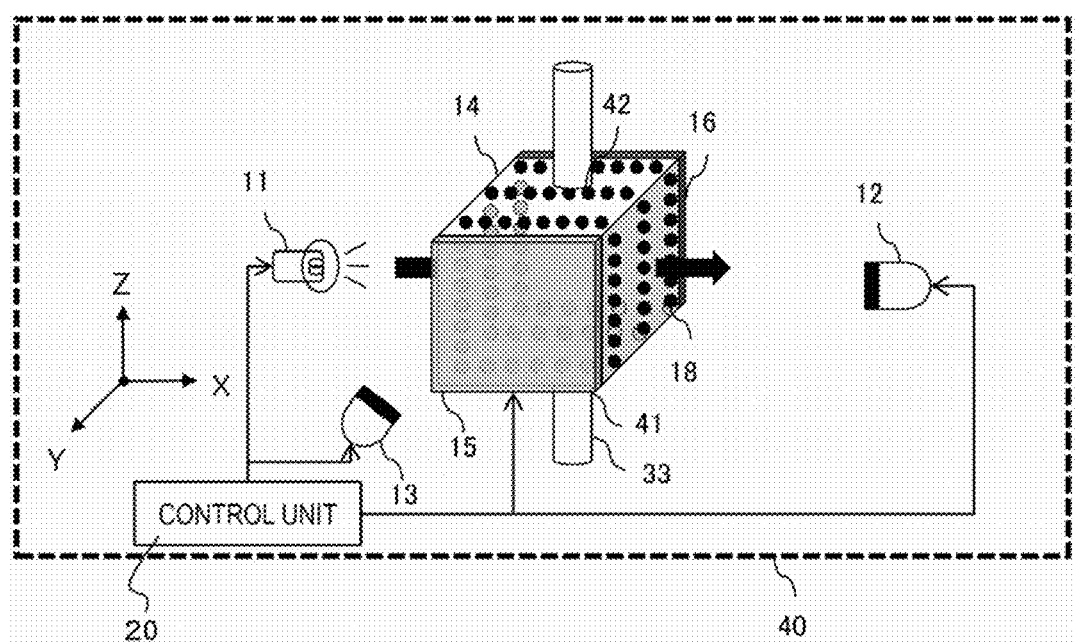
FIG. 7 is a diagram showing a configuration example of an optical analysis device 40 in the optical analysis system 30.

Next, FIG. 7 shows a configuration example of the optical analysis device 40. The optical analysis device 40 is configured by adding an introduction port 41 and a discharge port 42 instead of the introduction port 17 from the optical analysis device 10 (FIG. 2). Among components of the optical analysis device 40, components common to those of the optical analysis device 10 are denoted by same reference numerals, and the description thereof is omitted as appropriate.

The optical analysis device 40 is connected to an outflow port 32 (FIG. 6) of the reaction vessel 31 via the introduction port 41 and the pipe 33. The optical analysis device 40 is connected to an inflow port 35 (FIG. 6) of the reaction vessel 31 via the discharge port 42, the pipe 33, and the pump 34. Therefore, when the pump 34 is driven, a liquid sample having a predetermined flow rate is introduced into the optical analysis device 40 through the introduction port 41, and is discharged from the discharge port 42.

It is desirable that a material of the pipe 33 is excellent in heat resistance, pressure resistance, and mechanical strength, easy to clean and sterilize, and non-invasive to a substance in the reaction vessel 31.

In FIG. 7, an ultrasonic wave is emitted from the ultrasonic irradiation unit 15 in the optical analysis device 40, a standing wave is generated in the liquid sample accommodated in the measurement cell 14, and the scatterers 18 are aggregated in the node.

Figure 8:
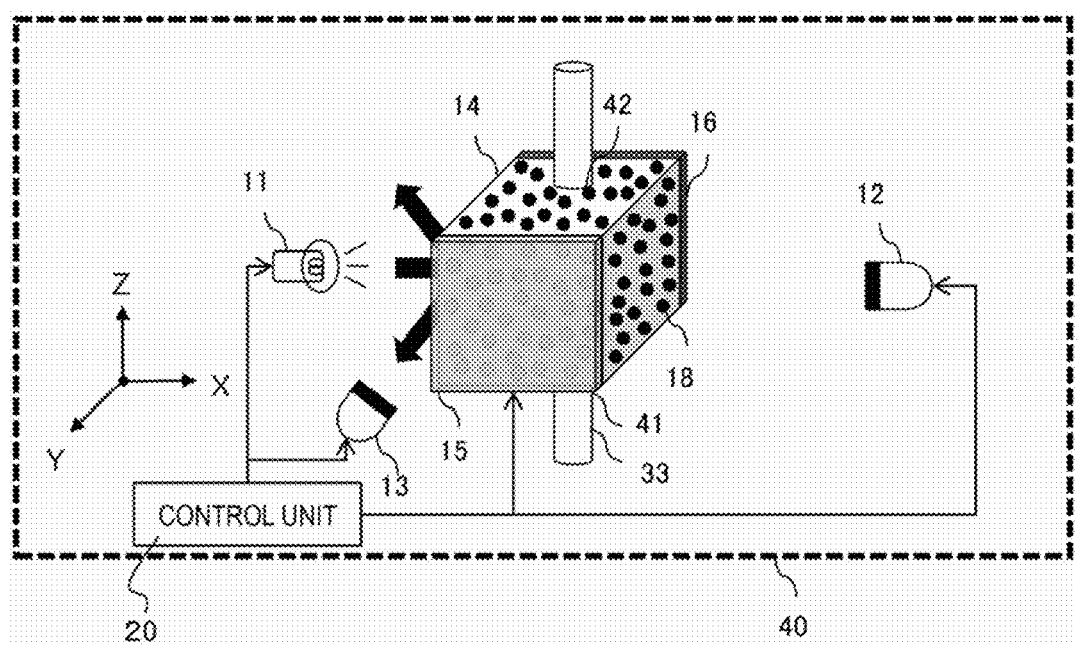
FIG. 8 is a diagram showing a case where an ultrasonic wave is not emitted in the optical analysis device 40.

Next, FIG. 8 shows a case where an ultrasonic wave is not emitted from the ultrasonic irradiation unit 15 in the optical analysis device 40, and the liquid sample accommodated in the measurement cell 14 is in a state where the scatterers 18 are dispersed.

<Analysis Processing by Optical Analysis System 30>

Analysis processing by the optical analysis system 30 can be executed in the same manner as the first analysis processing (FIG. 4) or the second analysis processing (FIG. 5) described above, except that the liquid sample is circulated by the pump 34.

Therefore, according to the analysis processing by the optical analysis system 30, the scatterer component and the solution component in the liquid sample can be analyzed continuously and quickly. Further, since both the scatterer component and the solution component in the liquid sample can be analyzed by one optical analysis device 40, a scale of devices and the required number of each component can be reduced to half as compared with a case of using two optical analysis devices.

In addition, in a case of the optical analysis system 30, labor to collect the liquid sample can be skipped, and contamination (foreign matter contamination or the like) that may occur at the time of collection can be prevented.

However, when a flow rate at which the liquid sample is circulated is too fast, the scatterers cannot aggregate and a transparent region is not formed in the liquid sample, and therefore, accurate analysis of the solution component cannot be performed. Therefore, it is necessary to adjust driving of the pump 34 so as to achieve an appropriate flow rate.

Figure 9:
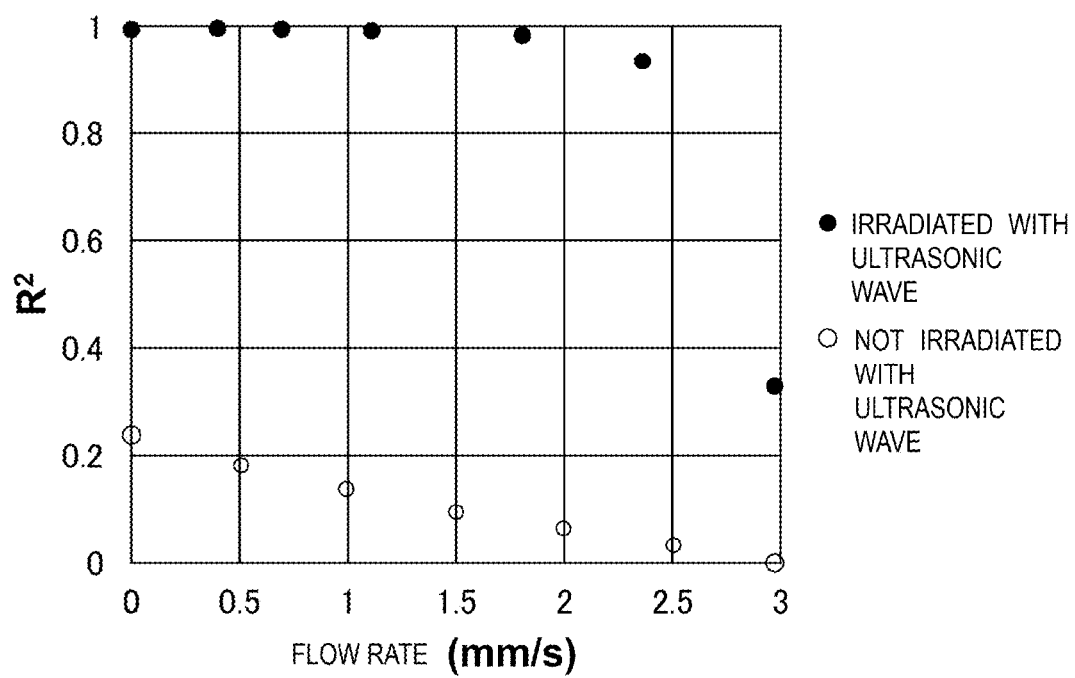
FIG. 9 is a diagram showing a relationship between a flow rate of a liquid sample and a determination coefficient.

Next, FIG. 9 shows an example of a relationship between the flow rate of the liquid sample and analysis accuracy of the solution component that is based on the light receiving result by the first light receiving unit 12. In the figure, a horizontal axis represents the flow rate of the liquid sample, and a vertical axis represents a determination coefficient $R^2$ (validation).

The determination coefficient $R^2$ represents a correlation coefficient between a predicted value and a true value as a value of 0 or more and 1 or less as a kind of index value indicating the analysis accuracy. In general, when the determination coefficient $R^2$ is 0.85 or more, it can be determined that the analysis accuracy is high.

In an example of the figure, a solvent of the liquid sample is pure water, a solute is glucose (concentration: 0 [mm/L] to 100 [mm/L], and a polystyrene particle having a diameter of 3 [atm] (concentration: $1.7 \times 10^9$ [number/ml]) is employed as the scatterer. Irradiation light from the light source unit 11 is near-infrared light, a distance (optical path length) that the irradiation light passes through the liquid sample is 1 [mm], frequency of the ultrasonic wave is 2.02 [MHz], and the flow rate of the liquid sample is changed in a range of 0 [mm/s] to 3 [mm/s].

As shown by white circles in the figure, when not being irradiated with the ultrasonic wave, the scatterers are dispersed in the liquid sample regardless of the flow rate, and the irradiation light is hardly transmitted. Accordingly, the determination coefficient $R^2$ is less than 0.85 (0.3 or less), which indicates that it is impossible to analyze the solution component with high accuracy. In addition, as shown by black circles in the figure, when being irradiated with the ultrasonic wave, the scatterers are aggregated at a range of flow rate from 0 [mm/s] to 2.5 [mm/s] to form the transparent region in the liquid sample, and the irradiation light is easily transmitted. Accordingly, the determination coefficient $R^2$ is 0.85 or more, which indicates that it is possible to analyze the solution component with high accuracy up to the flow rate of 2.5 [mm/s].

Therefore, it is desirable that the circulation of the liquid sample by the pump 34 is kept at the flow rate of about 2.5 [mm/s].

Figure 10:
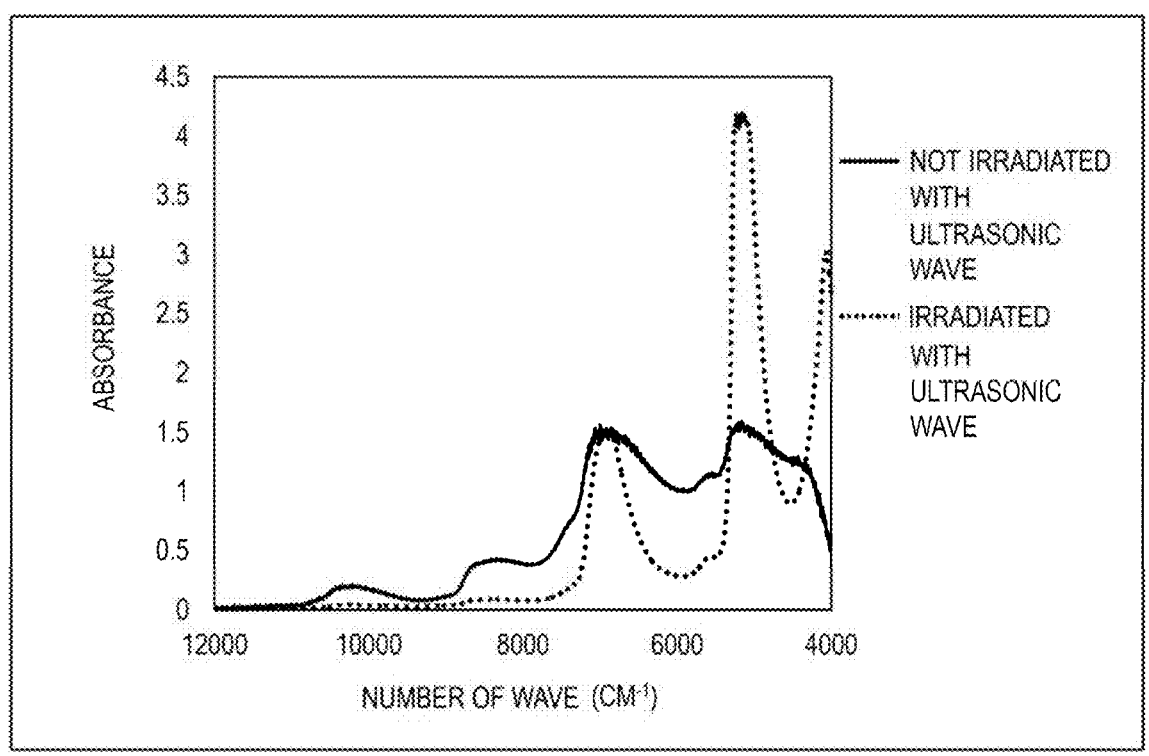
FIG. 10 is a diagram showing a relationship between the wave number and absorbance of received light.

Next, FIG. 10 shows an example of a spectrum of light received by the first light receiving unit 12 and the second light receiving unit 13. In the figure, a horizontal axis represents the wave number of the liquid sample, and a vertical axis represents absorbance.

An example in the figure shows a case where a liquid sample similar to that in FIG. 9 is used and the flow rate of the liquid sample is 0 [mm/s.]

A broken line shown in the figure indicates a spectrum of the transmitted light received by the first light receiving unit 12 when the ultrasonic irradiation unit 15 emits the ultrasonic wave, the scatterers are aggregated due to the standing wave of the ultrasonic wave, and the irradiation light is easily transmitted. A full line shown in the figure indicates a spectrum of the scattered light received by the second light receiving unit 13 when the ultrasonic irradiation unit 15 stops the ultrasonic irradiation, the standing wave of the ultrasonic wave no longer exists, the scatterers are dispersed, and the irradiation light is easily reflected.

As is clear by comparing the broken line and the full line, since the spectrum of the transmitted light and the spectrum of the scattered light are distinctly different in shape, it can be seen that information on different components, that is, information on the solution component and information on the scatterer component can be obtained.

<Optical Analysis Device According to Third Embodiment of Invention>

Figure 11:
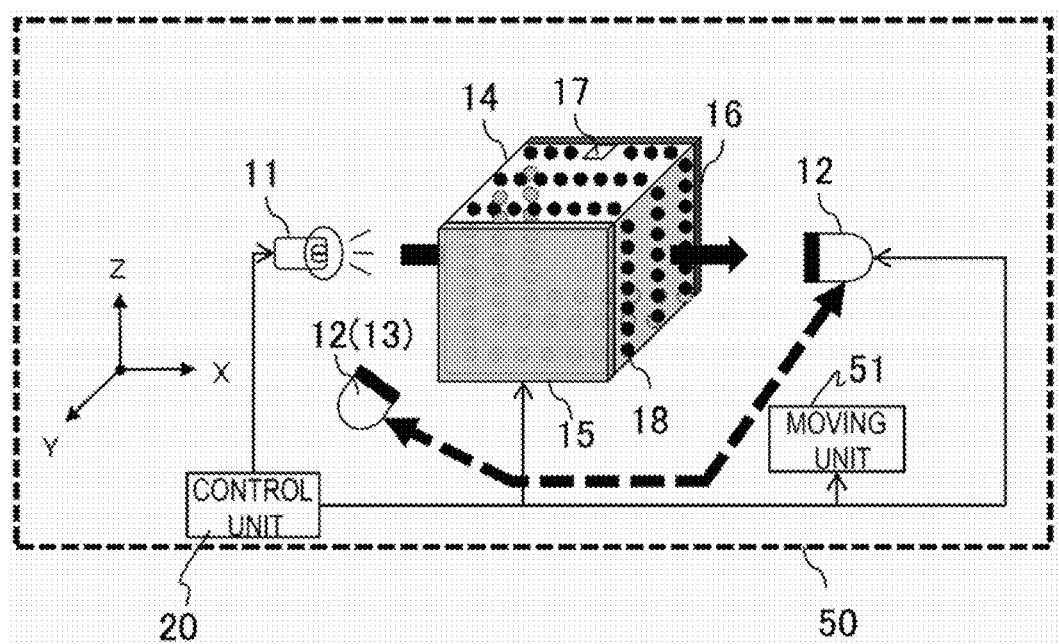
FIG. 11 diagram showing a configuration example of an optical analysis device 50 according to a third embodiment of the invention.

Next, FIG. 11 shows a configuration example of an optical analysis device 50 according to a third embodiment of the invention.

In the optical analysis device 50, one (the first light receiving unit 12 in the same figure) of the first light receiving unit 12 and the second light receiving unit 13 of the optical analysis device 10 (FIG. 2) is movable so as to serve as the other (the second light receiving unit 13 in the same figure), and a moving unit 51 that moves the one of the first light receiving unit 12 and the second light receiving unit 13 is added, and the other of the first light receiving unit 12 and the second light receiving unit 13 is omitted. The moving unit 51 can be realized by a mechanical structure such as a motor, a rail, a belt, or a gear. The moving unit 51 can move one of the first light receiving unit 12 and the second light receiving unit 13 from an original position thereof to a position where the other one is located and then return back to the original position in accordance with control from the control unit 20.

Among components of the optical analysis device 50, components common to those of the optical analysis device 10 are denoted by same reference numerals, and the description thereof is omitted as appropriate.

<Analysis Processing by Optical Analysis Device 50>

Figure 12:
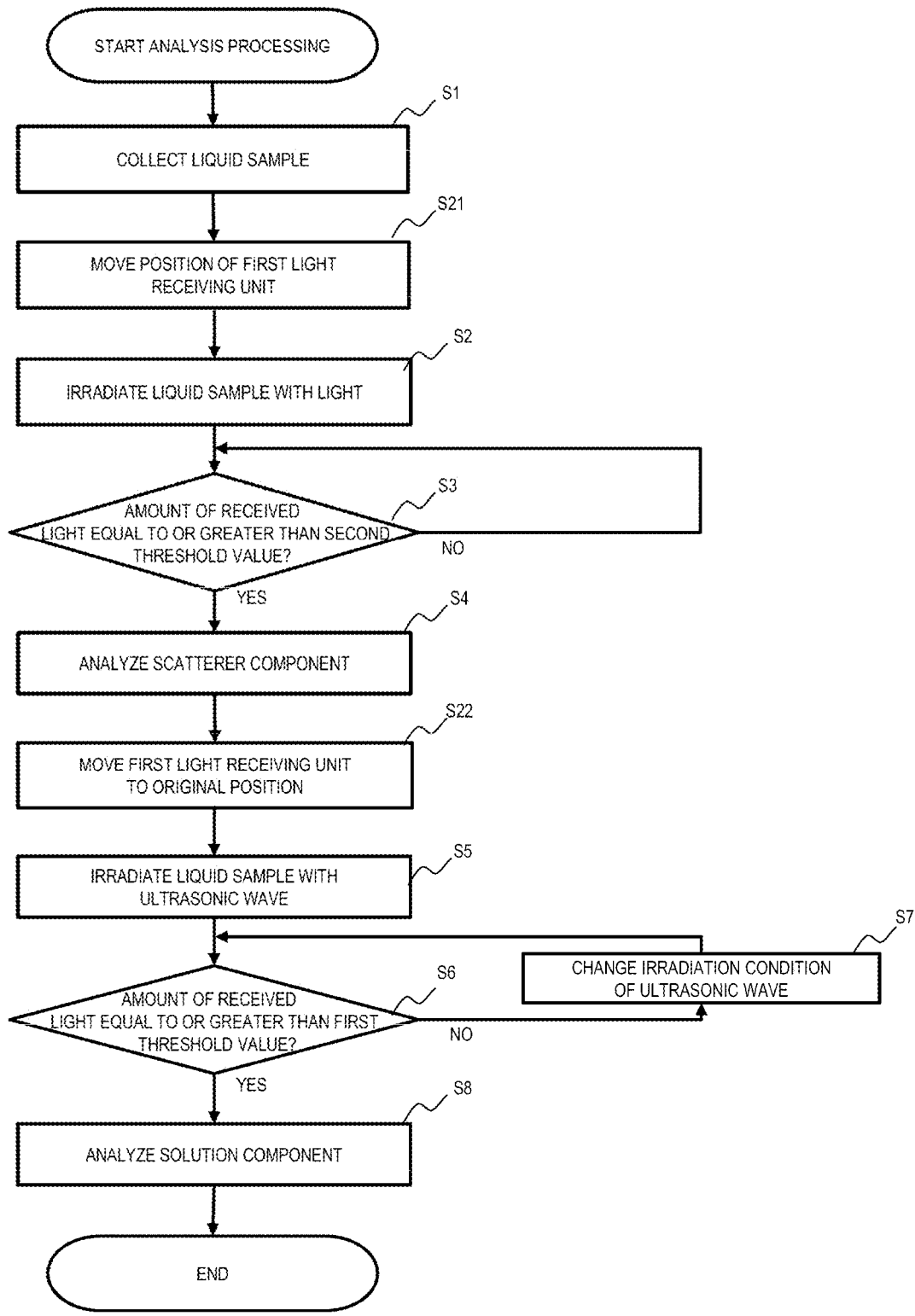
FIG. 12 is a flowchart illustrating an example of analysis processing by the optical analysis device 50.

Next, FIG. 12 is a flowchart illustrating an example of analysis processing by the optical analysis device 50 (hereinafter, referred to as first analysis processing). In the first analysis processing by the optical analysis device 50, step S21 is added between Step S1 and Step S2 in the first analysis processing (FIG. 4) by the optical analysis device 10 (FIG. 2), and step S22 is added between Step S4 and Step S5. Therefore, steps other than step S21 and step S22 in the first analysis processing by the optical analysis device 50 are the same as those in the first analysis processing (FIG. by the optical analysis device 10 (FIG. 2), and the description thereof is omitted as appropriate.

First, after step S1 is performed by a user, the moving unit 51 moves the first light receiving unit 12 to a position where the scattered light can be received (position where the second light receiving unit 13 is located in the optical analysis device 10 (FIG. 2)) in accordance with the control from the control unit 20 (step S21). When the first light receiving unit 12 is moved to the position where the scattered light can be received, step S21 can be omitted.

Next, steps S2 to S4 are performed to analyze the scatterer component in the liquid sample, store an analysis result, display the analysis result on a display, or output the analysis result to an external device.

Next, the moving unit 51 moves the first light receiving unit 12 to the original position where the transmitted light can be received (position where the first light receiving unit 12 is located in the optical analysis device 10 (FIG. 2)) in accordance with the control from the control unit 20 (step S22).

Next, steps S5 to S8 are performed to analyze the solution component in the liquid sample, store an analysis result, display the analysis result on a display, or output the analysis result to an external device.

Thus, the first analysis processing by the optical analysis device 50 is ended. According to the first analysis processing, the scatterer component and the solution component in the liquid sample can be analyzed continuously and quickly. Since the analysis is performed after the amount of the received scattered light or the received transmitted light is equal to or greater than a predetermined threshold value, the optical analysis with higher accuracy can be performed. Further, the number of light receiving units can be reduced to one as compared with the optical analysis device 10.

Figure 13:
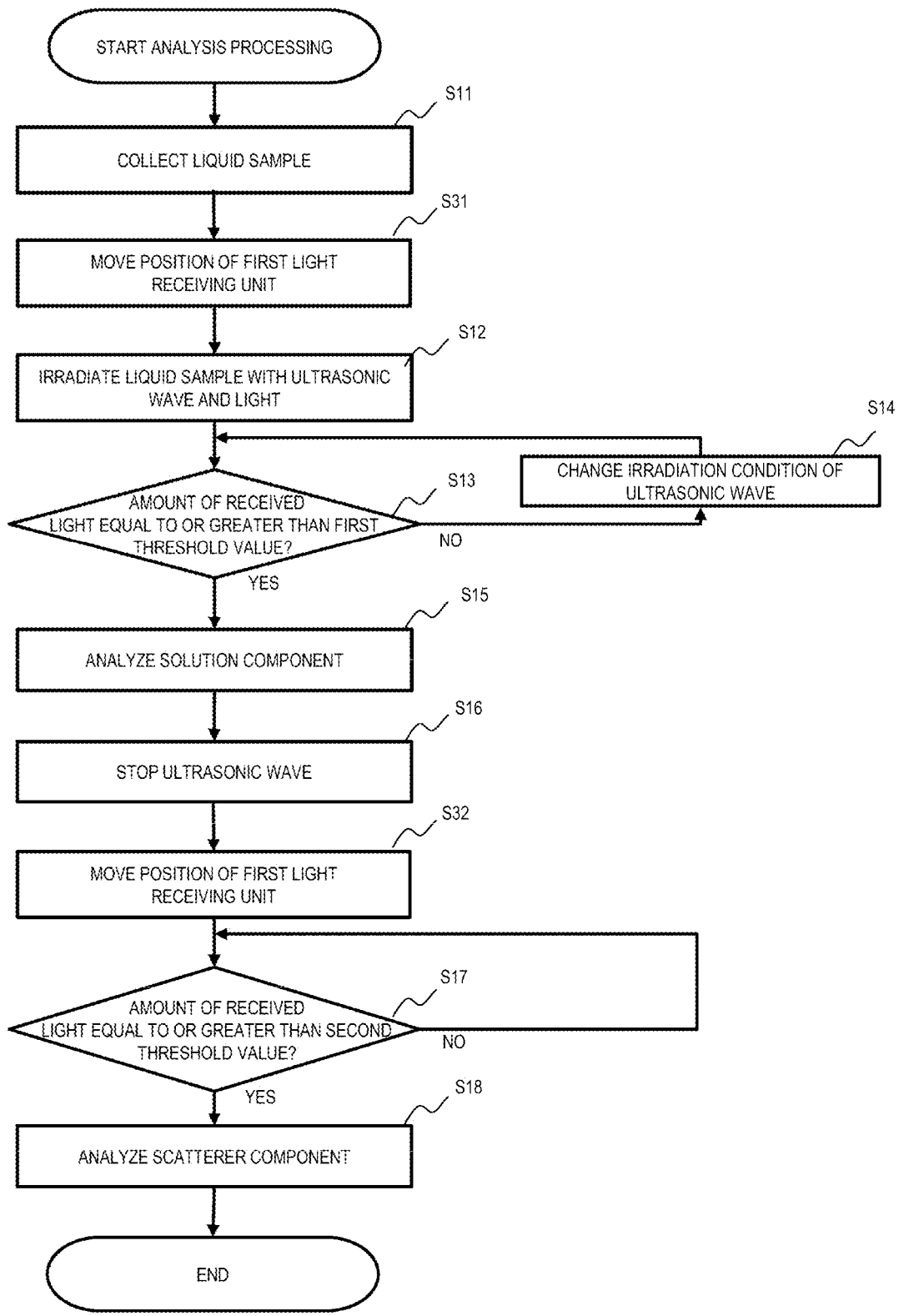
FIG. 13 is a flowchart illustrating another example of the analysis processing by the optical analysis device 50.

Next, FIG. 13 is a flowchart illustrating an example of the analysis processing by the optical analysis device 50 (hereinafter, referred to as second analysis processing). In the second analysis process by the optical analysis device 50, step S31 is added between step S11 and step S12 in the second analysis processing (FIG. 5) by the optical analysis device 10 (FIG. 2), and step S32 is added between S16 and S17. Therefore, steps other than steps S31 and S32 in the second analysis processing by the optical analysis device 50 are the same as those in the second analysis processing (FIG. 5) by the optical analysis device 10 (FIG. 2), and the description thereof is omitted as appropriate.

First, after step S11 is performed by a user, the moving unit 51 moves the first light receiving unit 12 to a position where the transmitted light can be received (position where the first light receiving unit 12 is located in the optical analysis device 10 (FIG. 2)) in accordance with the control from the control unit 20 (step S31). When the first light receiving unit 12 is already moved to the position where the transmitted light can be received, step S31 can be omitted.

Next, steps S12 to S16 are performed to analyze the solution component in the liquid sample, store an analysis result, display the analysis result on a display, or output the analysis result to an external device. Then, the ultrasonic irradiation is stopped.

Next, the moving unit 51 moves the first light receiving unit 12 to a position where the scattered light can be received (position where the second light receiving unit 13 is located in the optical analysis device 10 (FIG. 2)) in accordance with the control from the control unit 20 (step S32).

Next, steps S17 and S18 are performed to analyze the scatterer component in the liquid sample, store an analysis result, display the analysis result on a display, or output the analysis result to an external device.

Thus, the second analysis processing by the optical analysis device 50 is ended. According to the second analysis processing, the scatterer component and the solution component in the liquid sample can be analyzed continuously and quickly. Since the analysis is performed after the amount of the received scattered light or the received transmitted light is equal to or greater than a predetermined threshold value, the optical analysis with higher accuracy can be performed. Further, the number of light receiving units can be reduced to half as compared with the optical analysis device 10.

Also in the optical analysis device 50, similarly to the optical analysis device 10, the first analysis processing can end a series of processing in a shorter time than the second analysis processing.

Further, when comparing the first analysis processing by the optical analysis device 10 and the first analysis processing by the optical analysis device 50, the optical analysis device 10 can end a series of processing in a shorter time than the optical analysis device 50 since the optical analysis device 10 does not require a moving time of the first light receiving unit 12.

<Modification>

In the optical analysis device 40 (FIG. 7), similarly to the optical analysis device 50 (FIG. 11), the moving unit 51 that moves the first light receiving unit 12 may be added, and the second light receiving unit 13 may be omitted.

The present invention is not limited to the embodiments described above, and various modifications can be made. For example, each embodiment described above is detailed for easy understanding but the invention is not necessarily limited to include all the above configurations. In addition, a part of a configuration of one embodiment may be replaced with or added to a configuration of another embodiment.

Each of the configurations, functions, processing units, processing methods described above may be partially or entirely implemented by hardware such as through design using an integrated circuit. The above-described configurations, functions, and the like may also be realized by software by interpreting and executing programs that realize respective functions by a processor. Information such as a program, a table, and a file that implements each function can be stored in a recording device such as a memory, a hard disk, a Solid State Drive (SSD), or in a recording medium such as an IC card, an SD card, or a DVD.

Control lines and information lines indicate what is considered necessary for explanation, and not all control lines and information lines in the products are shown. It may be considered that almost all the configurations are actually connected to each other.

What is claimed is:

1. An optical analysis device, comprising:
   a light source unit configured to irradiate a liquid sample with light;
   a first light receiving unit configured to receive transmitted light that is emitted from the light source unit and transmitted through the liquid sample;
   a second light receiving unit configured to receive scattered light that is emitted from the light source unit and scattered by a scatterer in the liquid sample;
   an ultrasonic irradiation unit configured to irradiate the liquid sample with an ultrasonic wave;
   a reflection plate configured to reflect the ultrasonic wave that is emitted from the ultrasonic irradiation unit and propagated through the liquid sample; and
   a control unit configured to control the light source unit, the first light receiving unit, the second light receiving unit, and the ultrasonic irradiation unit.

2. The optical analysis device according to claim 1, wherein
   the control unit is configured to
      acquire a light receiving result of the scattered light from the second light receiving unit in a state where the ultrasonic wave is not emitted from the ultrasonic irradiation unit, and
      acquire a light receiving result of the transmitted light from the first light receiving unit in a state where the ultrasonic wave is emitted from the ultrasonic irradiation unit.

3. The optical analysis device according to claim 2, wherein
   when intensity of received light that is represented by the receiving result of the scattered light acquired from the second light receiving unit is less than a predetermined second threshold value in a state where the ultrasonic wave is not emitted from the ultrasonic irradiation unit, the control unit waits until the intensity of received light that is represented by the receiving result of the scattered light is equal to or greater than the predetermined second threshold value.

4. The optical analysis device according to claim 3, wherein
   when the intensity of received light that is represented by the receiving result of the scattered light acquired from the second light receiving unit is less than the predetermined second threshold value in a state where the ultrasonic wave is not emitted from the ultrasonic irradiation unit, the control unit waits until the intensity of received light that is represented by the receiving result of the scattered light is equal to or greater than the predetermined second threshold value, and analyzes a scatterer component in the liquid sample based on the light receiving result in a state where the intensity of received light that is represented by the receiving result of the scattered light is equal to or greater than the predetermined second threshold value.

5. The optical analysis device according to claim 2, wherein
   when intensity of received light that is represented by the receiving result of the transmitted light acquired from the first light receiving unit is less than a predetermined first threshold value in a state where the ultrasonic wave is emitted from the ultrasonic irradiation unit, the control unit changes an irradiation condition of the ultrasonic wave by the ultrasonic irradiation unit so that the intensity of received light that is represented by the receiving result of the transmitted light is equal to or greater than the predetermined first threshold value.

6. The optical analysis device according to claim 5, wherein
   when the intensity of received light that is represented by the receiving result of the transmitted light acquired from the first light receiving unit is less than the predetermined first threshold value in a state where the ultrasonic wave is emitted from the ultrasonic irradiation unit, the control unit changes the irradiation condition of the ultrasonic by the ultrasonic irradiation unit so that the intensity of received light that is represented by the receiving result of the transmitted light is equal to or greater than the predetermined first threshold value, and analyzes a solution component in the liquid sample based on the light receiving result in a state where the intensity of received light that is represented by the light receiving result of the transmitted light is equal to or greater than the predetermined first threshold value.

7. The optical analysis device according to claim 2, wherein
   the control unit is configured to
      acquire the light receiving result of the scattered light from the second light receiving unit in a state where the ultrasonic wave is not emitted from the ultrasonic irradiation unit, and
      then acquire the light receiving result of the transmitted light from the first light receiving unit in a state where the ultrasonic irradiation unit starts to emit the ultrasonic wave.

8. The optical analysis device according to claim 2, wherein
   the control unit is configured to
      acquire the light receiving result of the transmitted light from the first light receiving unit in a state where the ultrasonic wave is emitted from the ultrasonic irradiation unit, and
      then acquire the light receiving result of the scattered light from the second light receiving unit in a state where the ultrasonic irradiation unit stops to emit the ultrasonic wave.

9. The optical analysis device according to claim 1, further comprising:
   a moving unit configured to move a position of one of the first light receiving unit and the second light receiving unit, wherein
   the one of the first light receiving unit and the second light receiving unit also serves as another.

10. The optical analysis device according to claim 1, further comprising:

a measurement cell that accommodates the liquid sample, wherein the measurement cell includes:
an introduction port through which the liquid sample is introduced, and
a discharge port through which the liquid sample is discharged.

11. An optical analysis method, comprising:
a light irradiation step of irradiating a liquid sample with light;
an ultrasonic irradiation step of irradiating the liquid sample with an ultrasonic wave;
a first light receiving step of receiving transmitted light obtained by the light emitted in a state where the ultrasonic wave is emitted transmitting through the liquid sample;
a second light receiving step of receiving scattered light obtained by the light emitted in a state where the ultrasonic wave is not emitted being scattered by a scatterer in the liquid sample.

12. The optical analysis method according to claim 11, further comprising:
a circulation step of circulating the liquid sample between a reaction vessel in which the liquid sample is stored and a measurement cell in which the liquid sample is accommodated.

13. An optical analysis system, comprising:
a reaction vessel in which a liquid sample is stored; and
an optical analysis device that is connected to the reaction vessel so that the liquid sample is able to be circulated via a pipe, wherein the optical analysis device includes:
a light source unit configured to irradiate a liquid sample with light;
a first light receiving unit configured to receive transmitted light that is emitted from the light source unit and transmitted through the liquid sample;
a second light receiving unit configured to receive scattered light that is emitted from the light source unit and scattered by a scatterer in the liquid sample;
an ultrasonic irradiation unit configured to irradiate the liquid sample with an ultrasonic wave;
a reflection plate configured to reflect the ultrasonic wave that is emitted from the ultrasonic irradiation unit and propagated through the liquid sample; and
a control unit configured to control the light source unit, the first light receiving unit, the second light receiving unit, and the ultrasonic irradiation unit, and the reaction vessel includes:
an outflow port through which the liquid sample is supplied to the optical analysis device via the pipe; and
an inflow port through which the liquid sample discharged from the optical analysis device flows in via the pipe.

\* \* \* \* \*